E. WALKER.
METHOD OF MAKING CORKSCREWS.
APPLICATION FILED NOV. 8, 1909.
1,038,692.
Patented Sept. 17, 1912.
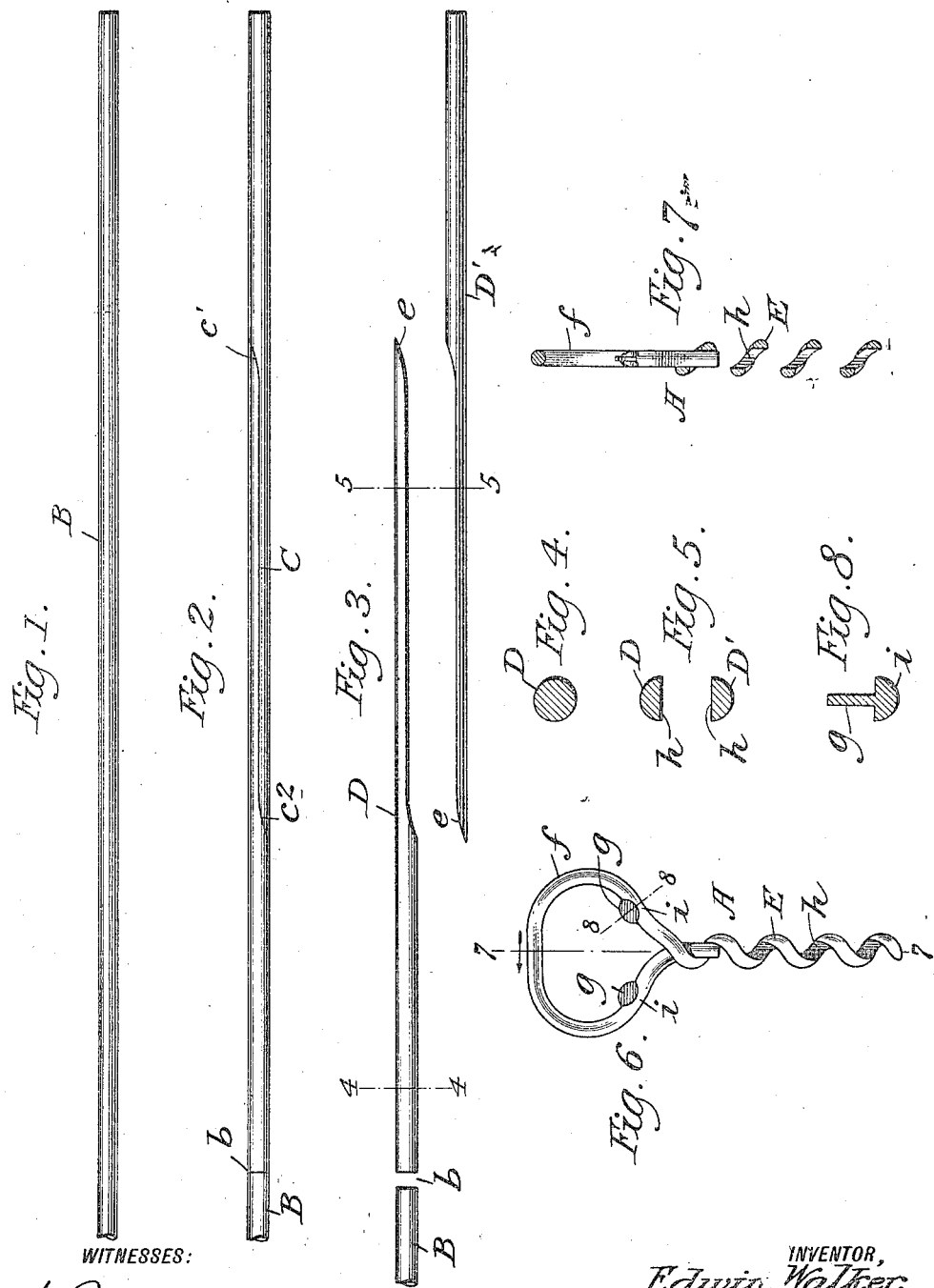
WITNESSES:
A. R. Appleman
M. C. Powell
INVENTOR,
Edwin Walker
BY Griffens Bernhard
ATTORNEYS

UNITED STATES PATENT OFFICE.

EDWIN WALKER, OF ERIE, PENNSYLVANIA.

METHOD OF MAKING CORKSCREWS.

1,038,692.     Specification of Letters Patent.     Patented Sept. 17, 1912.

Application filed November 8, 1909. Serial No. 526,692.

*To all whom it may concern:*

Be it known that I, EDWIN WALKER, a citizen of the United States, residing in Erie, county of Erie, and State of Pennsylvania, have invented a certain new and useful Method of Making Corkscrews, of which the following is a specification.

This invention is a method of making a cork screw and involves splitting, or otherwise manipulating, a wire or rod so as to produce two blanks at one operation, each being pointed and coiled as hereinafter set forth so as to produce the screw.

My method secures material economy in the manufacture of cork screws, for the reason that at each operation on the stock material two blanks of the required length and shape are produced, each of said blanks being pointed at one end. The stock material is drawn from a reel, or other source of supply, and at one operation it is cut to the desired length and split lengthwise, the process being a substantially continuous one. The blanks are of peculiar form, each being circular in cross section for a part of its length, and for another part of its length, the blank is flat on one face and curved on its other face, whereby in coiling the blank on a mandrel the flat face thereof is brought into contact with the curved surface of the mandrel.

The operation of coiling the reduced part of the blank is performed easily and rapidly by appropriate machinery. In this connection, attention is called to the fact that it is not necessary to produce the point on the cork screw as a separate operation, for the reason that the point is produced by the operation of splitting or dividing the stock material.

In the accompanying drawings, I have illustrated different practical embodiments of the invention, but the construction shown therein is to be understood as illustrative, only, and not as defining the limits of the invention.

Figure 1 is a side view of the wire or rod which I employ in the manufacture of the article. Fig. 2 is an elevation of the rod or wire split or divided, and cut to the length required, in the operation of making the article. Fig. 3 is a view of the parts shown in Fig. 2, but illustrating the parts separated so as to produce two distinct blanks suitable for the manufacture of two cork screws and crown openers. Figs. 4 and 5 are cross sections on the lines 4—4 and 5—5, respectively, of Fig. 3, the parts being enlarged as compared with Fig. 3. Fig. 6 is a side view of one form of the combined cork screw and crown remover, made from one of the blanks shown in Fig. 3. Fig. 7 is a longitudinal section on the line 7—7 of Fig. 6, and Fig. 8 is a cross section through the looped handle and one of the lips swaged thereon, the plane of the section being indicated by the dotted line 8—8 of Fig. 6.

In making a cork screw and crown opener A, shown in Figs. 6 and 7, I start with a wire or rod, B, preferably cylindrical in cross section (see Figs. 1, 2 and 3), said wire or rod being pulled or drawn from a reel of stock material, or from any other source of supply. A suitable length of material is cut, at $b$, from the end of the wire, and this length is split or divided longitudinally and near its central portion along the line, C, see Fig. 2. Preferably, the transverse cut, $b$, and the longitudinal division, C, are performed at one operation, and by suitable machinery. The line of division, C, extends at its extremities in oppositely inclined directions, as at $c'$ $c^2$, (Fig. 2), and the cut length of the stock material is thus separated into two distinct blanks, D, D', as shown in Fig. 3. It will be observed that the method of making the blanks is not only rapid and economical, but that by splitting or dividing the material in the manner described, the desired bevel and point, $c$, on the cork screw is simultaneously produced on each of the two blanks, thereby dispensing with the usual operation of separately pointing or tapering the screw.

The blanks of the required form and length having been produced in the manner described, the split portion of each blank which forms the screw is wound or coiled around a suitable mandrel, so as to produce the desired convolutions. The coiled part, E, of the screw terminates in the beveled and pointed end, $c$, whereas the cylindrical part of the blank is, preferably, bent so as to produce a loop, $f$, said loop forming the handle for the screw. Obviously, the cylindrical or unsplit part of the blank may be attached to handles composed of wood, or other suitable material, and such attachment of the blank to a separate handle may be effected in various ways. I prefer, in the present instance, to bend the cylindrical part of the blank into the loop, $f$, for the reason, mainly, that said loop provides the material for the formation of lips or offsets, $g$, which, with the loop, constitutes the device for removing caps, or taking off the crowns, from bottles.

It will be noted that the surface, $h$, of the blank along the line of division, $C$, is plane or flat, and that in the operation of coiling said split part of the blank on the mandrel, this flat surface engages with the latter. On account of this inner surface, $h$, being flat, as described, the operation of coiling or producing the convolutions is accomplished with much greater ease than though the part to be coiled on the mandrel were circular in cross section. Moreover, by making this inner surface flat, the internal bore of the coil is considerably greater than though the cylindrical wire were used, such increase in the diameter of the bore being equal to the diameter of the wire employed. I secure a great advantage in the cork screw by providing this large bore in center of the screw as described, for the reason that the compression of the cork, centrally, is to a great extent avoided when the screw is inserted into said cork, thereby precluding a disruption or breaking up of the cork material when drawing the latter from a bottle, as is frequently the case with screws of ordinary construction. The making of the inner face of the screw flat, for the purposes specified, does not materially weaken the screw, since a stiff arched surface is provided on the outside of the screw, where the pulling action is applied, and, therefore, at the place where strength is desired. The operations described result in the production of a cork screw not only particularly efficient in operation, but possessing a maximum strength with the employment of a minimum amount of material.

Having produced the cork screw, in the manner described, the cylindrical portion of the blank, either before or after bending the same in the form of the loop, $f$, but preferably after such bending, is provided with lips or offsets, $g$, $g$, preferably two in number, which, in conjunction with the loop, form a crown opener. Said lips are formed within the loop by swaging the metal, in a suitable press so as to produce flat projections or offsets, extending centrally from the inner face of the wire, leaving a substantially semi-cylindrical portion of metal, $i$, see Fig. 8, rearwardly of each lip.

By providing the crown opener with two lips, instead of one as is usual, the pressure employed in removing the crown is distributed to better advantage, thereby opening the bottle easier, and with less danger of breaking the neck or mouth of the bottle. Moreover, the crown or cap is not so liable to be distorted, thereby enabling it to be again replaced on the bottle should this be desired. Then again, the flattened lips provide an extended and efficient bearing against which to apply pressure to the crown, thereby aiding in the easy removal of the latter.

In the form of cork screw and crown opener just described, and illustrated in Figs. 6 and 7, it will be noted that when the article is used as a cork screw the loop portion of the crown opener forms a handle therefor, and when used as a crown opener the screw forms a handle for the latter.

From the foregoing description of the invention it will be manifest that the article can be economically and expeditiously produced, because of the minimum amount of material employed, and, further, because the several steps or operations incident to the production of the article may be automatically performed by simple and well known mechanisms. Moreover, the resulting article is durable in construction and efficient in operation, and of a design pleasing to the eye.

Although I have shown and described the crown opener as a part of the cork screw, it is manifest that the crown opener may be made as a separate and distinct article. In this event, the stock material is cut at the proper point, the cut length of metal is bent to form a loop, and the metal is swaged to produce the lips or offsets in the loop, all as hereinbefore described.

The crown opener and the method of producing it forms the subject matter of a separate application filed by me July 19, 1910, Serial No. 572,681.

Having thus fully described the invention, what I claim as new, and desire to secure by Letters Patent is:

1. The method of making an article of the class described which consists in splitting a wire or rod so as to produce two blanks, each of which is substantially cylindrical in cross section at one portion of its length and substantially semicylindrical at another portion of its length, and then twisting the said semicylindrical portion so as to form cork screw convolutions therein, and with the flat face of said portion forming the inner surface of the convolutions.

2. The method of making an article of the class described which consists in splitting a wire or rod so as to produce two blanks, each of which is substantially cylindrical in cross section at one portion of its length and substantially semicylindrical at another portion of its length, then twisting the said semicylindrical portion so as to form cork screw convolutions therein, and with the flat face of said portion forming the inner surface of the convolutions, and then twisting the said cylindrical portion into a loop whereby a handle is formed for the screw.

In testimony whereof I have signed my name to this specification in the presence of two subscribing witnesses.

EDWIN WALKER.

Witnesses:
C. L. WALKER,
HENRY L. MORSE.